Feb. 8, 1938. H. S. JANDUS ET AL 2,107,331
TIRE COVER
Filed Aug. 11, 1930   2 Sheets-Sheet 2
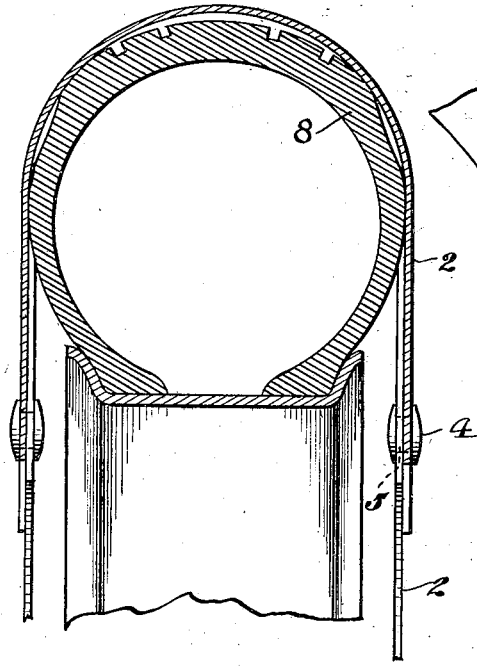
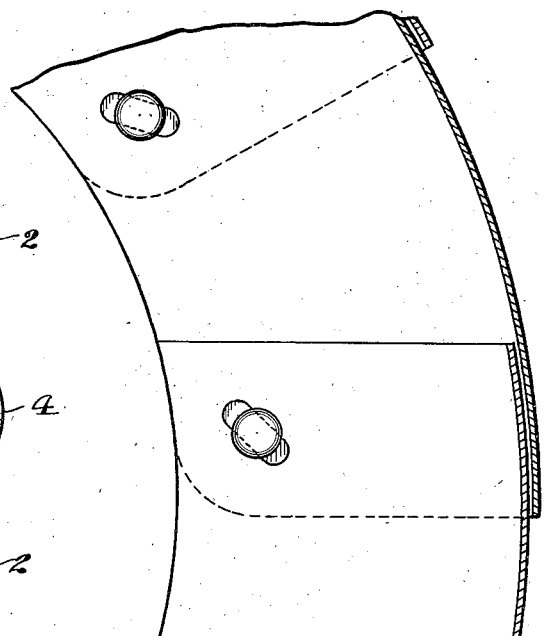
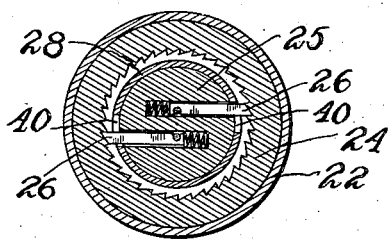
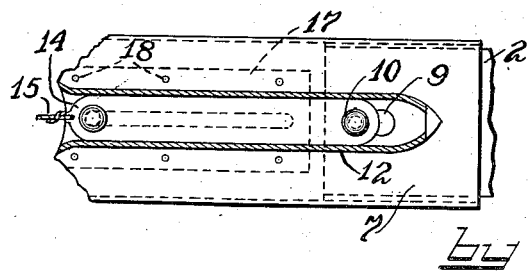
Inventors
Herbert S. Jandus
Theodore J. W. Tyson Patented Feb. 8, 1938

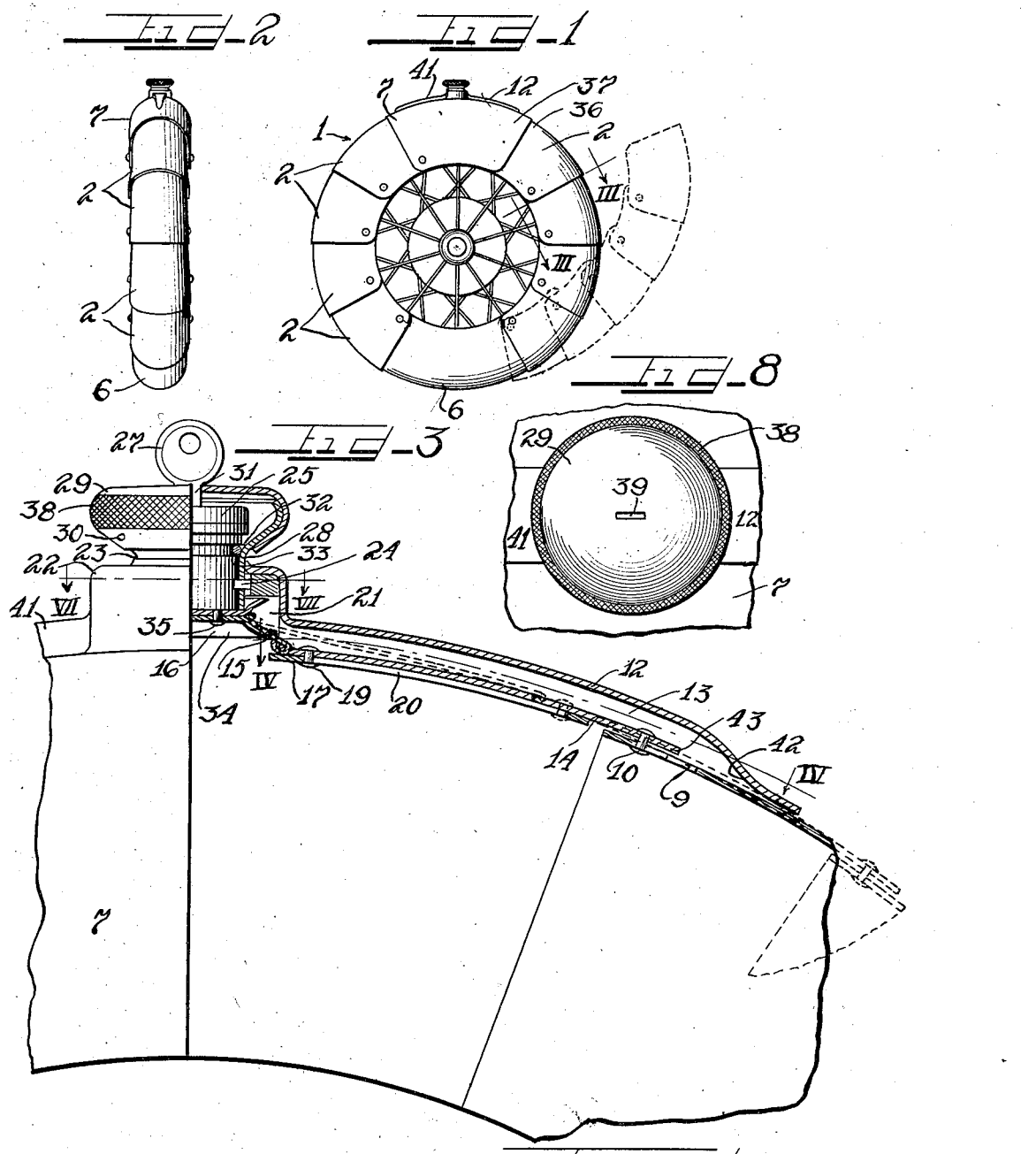

2,107,331

UNITED STATES PATENT OFFICE 2,107,331

TIRE COVER

Herbert S. Jandus and Theodore J. W. Tyson, Detroit, Mich., assignors, by mesne assignments, to Houdaille-Hershey Corporation, Detroit, Mich., a corporation of Michigan Application August 11, 1930, Serial No. 474,612

9 Claims. (Cl. 150—54)

This invention has to do with tire covers and means for locking the same on a spare tire. One of the objects of the invention is to provide an articulated cover which will adapt itself to all sizes of tires. A further object is to provide instrumentalities for locking such cover in such a manner as to inhibit access to the locking parts and thereby render the cover theft-proof. A further object lies in the provision of means connecting the various parts of the cover so that when the same is installed, rattling is obviated. A still further object of the invention resides in the provision of a cover and lock therefor which are of pleasing appearance, easily assembled and disassembled, protect the tire from deterioration due to the elements and from direct injury and whose parts are so simple as to lend themselves to low cost of manufacture.

Further objects and advantages will appear as the description proceeds.

In the accompanying drawings:

Figure 1 illustrates our invention applied to a tire.

Figure 2 is a side view of the structure shown in Figure 1.

Figure 3 is an enlarged detail view showing a portion of the cover locking means, Figure 4 is a sectional view taken approximately in the plane indicated by the line 4—4 of Fig. 3, Figure 5 is a transverse sectional view illustrating how the sections fit over the tire and the manner in which the sections are connected, Figure 6 shows a portion of the tire cover with the sections in nested relation.

Figure 7 is a sectional view taken in the plane indicated by line VII—VII, in Figure 3, illustrating our novel cover locking means.

Figure 8 is a plan view of the cover locking means.

Referring now more particularly to the drawings wherein like reference characters indicate corresponding parts, numeral 1 designates the tire cover which comprises a plurality of substantially articulated sections 2 joined loosely together by pin and slot connections indicated generally at 3. As may be ascertained from Figure 6, each section 2 is nested within the preceding section very much in the manner of armor. It will be noted that, referring to the pin and slot connections indicated at 3, in each instance, the pin 4 is secured to the outer section and the slot 5 located in the portion of the section nested within the previous section. Thus all slots are hidden from view. It will be further noted that each slot 5 is inclined, the purpose of which will appear hereinafter.

In order to assure symmetry, the sets of sections are separated by additional sections 6 and 7, the section 6 being nested within the associated sections 2, and the section 7 being disposed outside of the associated sections 2. Each section is substantially U-shaped in cross section and is adapted to receive the tire as shown in Figure 5.

In order to maintain all parts of the cover in snug engagement with the tire, which is designated at 8, the section 2 adjacent the right end of locking section 7, as seen in Figure 1, is provided with a keyhole slot 9 in which a pin 10 loosely fits. The pin 10 is permanently attached to a plate 14 which is connected by a cable 15 or similar means to a sheave 16. The section 7 is bulged out at 12, thereby providing a space 13 which is permanently bridged by a plate 17, secured in place by rivets or the like 18. The plate 14 is provided with a pin 19 permanently attached thereto and slidable in the slot 20 of the plate 17. The plate 14 is disposed within the space 13 and it is thus evident that its motion is guided by the confines of the space 13 and by the walls of the slot 20.

The section 7 is provided centrally with a recess 21 having a substantially cylindrical housing 22 open centrally at 23. A ratchet 24 is permanently secured to the housing 22 by any suitable means. Disposed centrally of the housing 22 is a lock cylinder 25 of a common type including spring-pressed plungers 26 adapted normally to engage between the teeth of the ratchet 24. The lock cylinder 25 is provided with the usual tumbler means having a key opening to receive a key 27 by which the plungers 26 may be withdrawn from engagement with the ratchet 24 for independent movement of the lock cylinder relative thereto. The lock cylinder 25 is enclosed in a substantially cylindrical casing 28 through which the plungers 26 are adapted to extend. This casing is movable relative to the lock cylinder when the plungers are withdrawn. A cap 29 is permanently secured at 30 to the casing 28 and is provided centrally with an oblong slot 39 in which the neck 31 of the key 27 is received. The lock cylinder 25 is provided with an annular groove 32 in which a resilient split ring 33 fits. The ring 33 projects beyond the groove 32 to engage a portion of the casing 28 to prevent removal of the casing as will appear hereinafter.

Fixed to the bottom of the lock cylinder 25 by any suitable means, is the sheave 16 comprising a pair of identical annularly flanged members 34 fixed against relative rotation by means of dowels 35. The sheave 16 is disposed below the ratchet 24 and prevents removal of the lock cylinder 25. It will thus be seen that the split ring 33 referred to above serves to prevent removal of the casing 28 and cap 29, even when the plungers 26 are withdrawn.

The cover is applied to a tire in much the same manner as the articulated type of non-skid tire chain now commonly in use. The end 36 of the terminal section 2 is brought in proximity to the extremity 37 of the section 7, and is projected into the latter until the enlargement of the keyhole slot 9 is located in receiving relation to the pin 10. The pin 10 is then projected through the enlargement of the slot 9 and the sections are drawn away from each other until pin 10 is disposed as shown in Figure 3. The knurled portion 38 of the cap 29 is thereupon grasped and rotated in the direction permitted by the ratchet 24, thereby drawing the cable 15 about the sheave 16, until the end 36 exerts substantial tension on the cable 15. This will be realized through resistance to further rotation of the cap 29. The plungers 26 are then maintained, by spring means within the lock cylinder 25, in engagement with the ratchet 24, the teeth of which prevent retrograde rotation of the cylinder 25. It is thus evident that without the proper key, it is impossible to withdraw the plungers 26 from engagement with the ratchet 24 and consequently it is impossible to separate the terminal portions 36 and 37 to remove the cover.

When it is desired to remove the cover, it is necessary merely to insert the key 27 through the slot 39 of the cap 29 and into the opening of the tumbler lock cylinder 25, and to rotate the key a sufficient amount to withdraw the plungers 26 entirely within the cylinder 25. Due to the fit of the key neck 31 in the slot 39 of the cap 29 the said cap will necessarily rotate with the key. In order to provide for this contingency, the openings 40 in the casing 28 are made of sufficient length so that the walls thereof will not interfere with the retractive movement of the plungers 26. The cylinder 25 will be prevented from turning by reason of the tension of the cable 15 around the sheave 16. With the key in the tumbler means and the hand gripping the cap 29 sufficiently to maintain the plungers 26 retracted, said cap may be permitted to rotate in a direction opposite to the direction in which it was originally rotated, by reason of the pull exerted by the cable 15, the sloping wall 42 of the bulged portion 12 serving to cam the extremity 43 downward to permit passage of the pin 10 beyond the section 7, whereupon the end 36 is slackened sufficiently as shown in dotted lines in Figure 3 to permit the disengagement of the pin 10 therefrom through the keyhole 9.

When the sections are tightened about the tire, the pins 4 slide down the inclined slots 5, thereby wedging the adjacent sections together so that the possibility of rattling of the sections when the cover is locked on the tire is obviated.

The bulged portion 41 is provided merely to maintain the symmetry of the cover.

It will be understood from the foregoing that we have provided a tire cover which will prove an asset to a car not only as an object of beauty but one of substantial utility. The locking means we employ is extremely simple and it will be noted that all parts are concealed from view so that unauthorized access thereto is prevented.

The number of sections employed in the cover may be varied, and we, accordingly, do not limit ourselves to the number illustrated.

Having thus described the invention, what we claim is:

1. A tire cover for encircling the tread of a tire and means for drawing said cover into firm engagement with the tire, said cover including a plurality of overlapped tread engaging sections connected by means of pins and inclined slots, whereby said sections are wedged together to prevent rattling when the cover is tightly drawn about the tire.

2. A tire cover comprising a substantially ring-shaped member having movable ends, sheave and cable means associated with said ends for drawing said member into snug engagement with various sizes of tires, said member concealing said means to guard against tampering.

3. A tire cover comprising a flexible arcuate member having a variable closed perimeter, and means concealed by said member for shortening the perimeter of said member to cause the latter to firmly engage tires of various sizes, said member having a recess receiving said means so that the latter will not interfere with the fit of the cover on a tire.

4. A tire cover comprising a substantially ring shaped non-resilient member having relatively movable ends, and means concealed by said member for relatively moving said ends so as to reduce the diameter of the ring, and means for maintaining them in fixed relation to each other, whereby said member will snugly fit various sizes of tires.

5. A tire cover comprising a substantially ring shaped non-resilient member having relatively movable ends, means for relatively moving said ends so as to reduce the diameter of the ring, means for maintaining them in fixed relation to each other, whereby said member will snugly fit various sizes of tires, and instrumentalities for preventing unauthorized access to the last means.

6. A tire cover comprising a substantially ring shaped member of variable perimeter and having relatively movable ends, means including a sheave on one end and a cable connected to the sheave and to the other end for drawing said ends toward each other, whereby said member will snugly fit various sizes of tires, and instrumentalities for locking said ends against unauthorized disturbance.

7. A tire cover comprising a substantially ring shaped member of variable perimeter and having relatively movable ends, sheave and cable means associated with said ends for drawing said member into snug engagement with various sizes of tires and a device for preventing retrograde action of said cable.

8. A tire cover comprising a longitudinal series of pivotally and slidably connected segments including free terminal segments and having a combined circumferential extent of substantially a complete but split annulus, the connections between the segments being located adjacent the inner periphery of the cover to allow relative circumferential movement of the segments at the outer periphery, certain of said segments being aligned but movable apart and away from each other in opposite directions to open the cover and thereby enable the cover to assume an enlarged diameter when opened and removed from the tire.

9. A tire cover having a plurality of segments extending substantially throughout the circumference of the cover and with their adjacent edges generally radial, said segments having circumferentially flexible connections therebetween at said edges and said segments being relatively short so that said segments, upon relative circumferential movement thereof, enable the cover to assume an enlarged diameter when opened and removed from the tire, each of said connections including a pin on one segment and a cooperating slot in an adjacent segment receiving said pin.

HERBERT S. JANDUS.
THEODORE J. W. TYSON.